(12) United States Patent
Kolesnikov et al.

(10) Patent No.: US 8,443,205 B2
(45) Date of Patent: May 14, 2013

(54) SECURE FUNCTION EVALUATION TECHNIQUES FOR CIRCUITS CONTAINING XOR GATES WITH APPLICATIONS TO UNIVERSAL CIRCUITS

(75) Inventors: Vladimir Kolesnikov, Union City, NJ (US); Thomas Schneider, Bochum (DE)

(73) Assignee: Alcatel Lucent, Paris (FR)

( * ) Notice: Subject to any disclaimer, the term of this patent is extended or adjusted under 35 U.S.C. 154(b) by 1230 days.

(21) Appl. No.: 12/288,919

(22) Filed: Oct. 24, 2008

(65) Prior Publication Data

US 2009/0175443 A1 Jul. 9, 2009

Related U.S. Application Data

(60) Provisional application No. 61/010,427, filed on Jan. 8, 2008.

(51) Int. Cl.
*H04L 29/06* (2006.01)
(52) U.S. Cl.
USPC ............... 713/189; 380/28; 380/255; 326/8; 713/150; 726/26
(58) Field of Classification Search ............. 326/8, 104; 380/28, 255; 713/150, 189, 190; 726/26
See application file for complete search history.

(56) References Cited

U.S. PATENT DOCUMENTS 6,834,272 B1 * 12/2004 Naor et al. .................. 705/80

OTHER PUBLICATIONS

Vladimir Kolesnikov et al; Improved Garbled Circuit: Free XOR Gates and Applications; Automata, Languages and Programming; 2008; pp. 486-498; vol. 5126/2008; Springer Berlin/Heidelberg; Germany.
Dahlia Malkhi et al; Fairplay—A Secure Two-Party Computation System; Proceedings of the 13th Conference on USENIX Security Symposium; 2004; 17 pages; vol. 13; USENIX Association; Berkeley, CA; USA.
Yehuda Lindell et al; An Efficient Protocol for Secure Two-Party Computation in the Presence of Malicious Adversaries; Proceedings of EUROCRYPT 2007; 2007; pp. 1-35; EUROCRYPT 2007; Springer-Verlag.
Vladimir Kolesnikov; Gate Evaluation Secret Sharing and Secure One-Round Two-Party Computation; ASIACRYPT 2005; 2005; pp. 136-155; Springer, Berlin, Allemagne.
Vladimir Kolesnikov et al; A Practical Universal Circuit Construction and Secure Evaluation of Private Functions; Financial Cryptography; 2008; 15 pages; vol. 5143; Springer.

* cited by examiner

*Primary Examiner* — Jeffrey Pwu
*Assistant Examiner* — Thomas C Lauzon
(74) *Attorney, Agent, or Firm* — Carmen Patti Law Group, LLC

(57) ABSTRACT

An embodiment of the present invention provides a method that minimizes the number of entries required in a garbled circuit associated with secure function evaluation of a given circuit. Exclusive OR (XOR) gates are evaluated in accordance with an embodiment of the present invention without the need of associated entries in the garbled table to yield minimal computational and communication effort. This improves the performance of SFE evaluation. Another embodiment of the present invention provides a method that replaces regular gates with more efficient constructions containing XOR gates in an implementation of a Universal Circuit, and circuits for integer addition and multiplication, thereby maximizing the performance improvement provided by the above.

14 Claims, 4 Drawing Sheets

X SWITCHING BLOCK

Y SWITCHING BLOCK

X SWITCHING BLOCK

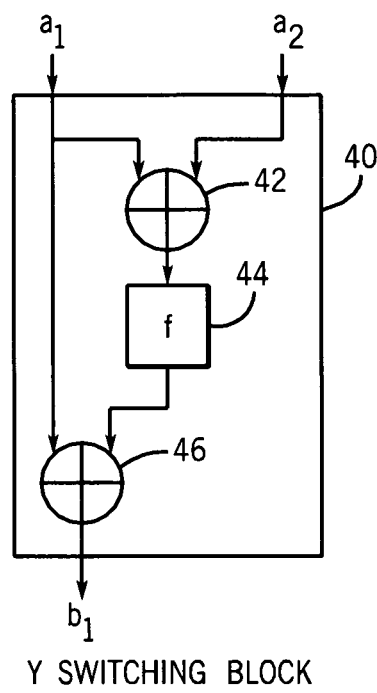
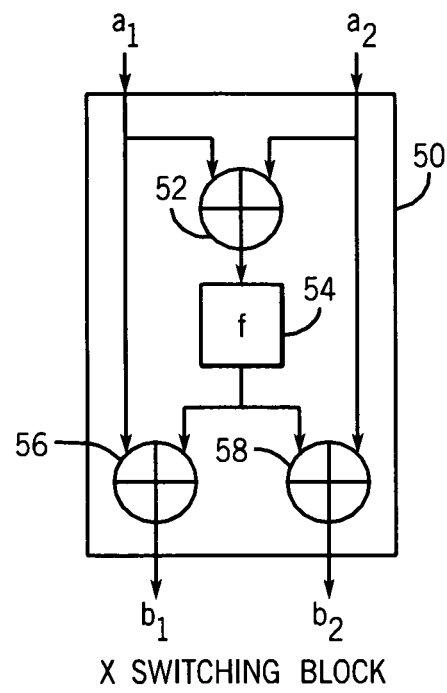
Y SWITCHING BLOCK
X SWITCHING BLOCK
FIG. 4
FIG. 5

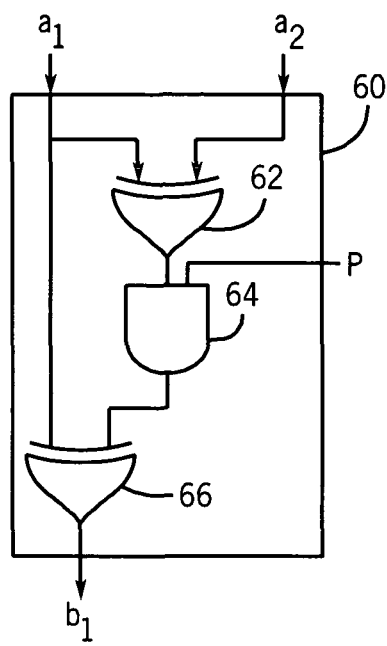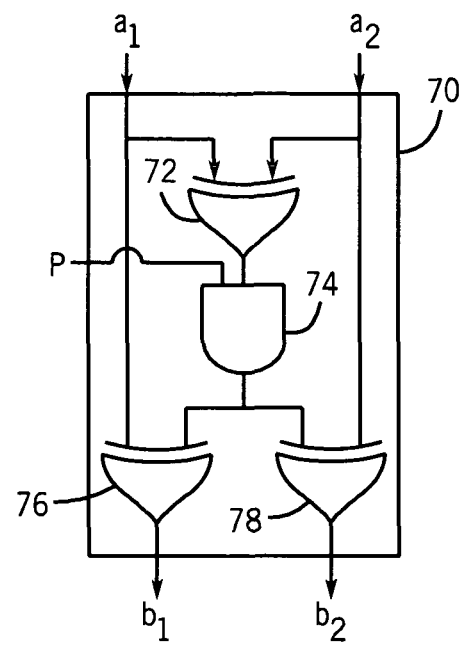
FIG. 6
Y SWITCHING BLOCK
FIG. 7
X SWITCHING BLOCK

FULL ADDER (FA)

N-BIT ADDER BUILT FROM n FA BLOCKS

SECURE FUNCTION EVALUATION TECHNIQUES FOR CIRCUITS CONTAINING XOR GATES WITH APPLICATIONS TO UNIVERSAL CIRCUITS

CROSS-REFERENCE TO RELATED APPLICATIONS

This application claims the benefit of U.S. Provisional Patent Application Ser. No. 61/010,427, filed Jan. 8, 2008.

BACKGROUND

This invention relates to electronic transactions, and more specifically to secure function evaluation (SFE) techniques that provide privacy to the parties. This invention is especially, but not exclusively, suited to the SFE of functions implemented by circuits containing exclusive OR (XOR) gates. A Universal Circuit which contains many XOR gates can benefit from construction in accord with this invention. This invention is particularly, but not exclusively, suitable for evaluation of private functions.

SFE implementations have been disclosed, e.g. see "Fairplay—A Secure Two-party Computation System" by D. Malkhi, N. Nisan, B. Pinkas and Y. Sella, USENIX 2004. Two-party general secure function evaluation (SFE) allows two parties to evaluate any function on their respective inputs x and y, while maintaining privacy of both x and y. SFE algorithms enable a variety of electronic transactions, previously impossible due to mutual mistrust of participants. Examples include auctions, contract signing, distributed database mining, etc. As computation and communication resources have increased, SFE has become practical. Fairplay is an implementation of generic two-party SFE with malicious players. It demonstrates the feasibility of SFE for many useful functions, represented as circuits of up to about $10^6$ gates. Another example of a SFE protocol implementation is "Y Lindell, B Pinkas, N. Smart, 'Implementing Two-party Computation Efficiently with Security Against Malicious Adversaries', SCN 2008".

The SFE of private functions (PF-SFE) is an extension of SFE where the evaluated function is known only by one party and needs to be kept secret (i.e. everything besides the size, the number of inputs and the number of outputs is hidden from the other party). Examples of private functions include airport no-fly check function, credit evaluation function, background- and medical history checking function, etc. Full or even partial revelation of these functions opens vulnerabilities in the corresponding process, exploitable by dishonest participants (e.g. credit applicants), and is desired to be prevented.

The problem of PF-SFE can be reduced to the "regular" SFE by evaluating a Universal Circuit (UC) instead of a predetermined circuit defining the evaluated function. A UC can be thought of as a program execution circuit capable of simulating any circuit C of certain size, given the description of C as input. Therefore, disclosing the UC does not reveal anything about C, except its size. The player holding C simply treats the description of C as an additional (private) input to the SFE.

A PF-SFE can utilize computer simulated Y and X switching blocks as illustrated by FIGS. 1 and 2, respectively, interconnected to perform the required function logic for a programmable permutation network of a UC. The illustrated Y switching block of FIG. 1 illustrates a single output that has a value selected to be one of its two inputs. The Y switching block is controlled to determine which of the two inputs is selected as the output. The X switching block of FIG. 2 has two outputs and two inputs where one output receives one of the two inputs and the other output receives the other input. The X switching block is controlled to determine which of the first and second inputs appears on the respective first and second outputs.

A known SFE implementation of a Y block uses a computer simulation of a 3-input gate (the two inputs of the Y block, and an additional control input) with a stored "garbled" table of $2^3=8$ encrypted table entries. A garbled table contains stored garbled values created using circuit input/output values that are transformed by mathematically applying secret values (garbled values) so that a person observing a garbled value cannot determine the corresponding circuit input/output values. Each garbled value may define a wire (input, output, control input) associated with a simulated circuit used to implement a universal circuit. Similarly, a known X block for use in an SFE implementation utilizes a computer simulation of two 3-input garbled gates (one for each of its two inputs) resulting in a garbled table of $2 \times 2^3=16$ table entries. Typical UCs will employ a substantial number of such gates resulting in a large number of corresponding table entries.

SUMMARY

It is an object of the present invention to provide a method of garbled circuit evaluation, where XOR gates are evaluated with minimal computational and communication effort by the evaluating parties. This improves the performance of SFE evaluation.

It is an object of the present invention to provide an implementation of a UC supporting an SFE where X blocks and Y blocks utilize primarily XOR gates. This implementation, in conjunction with almost free processing of XOR gates which is part of an embodiment of this invention, minimizes the total number of garbled table entries needed to define the respective circuit blocks of the UC, which improves performance of SFE evaluation.

An exemplary computer-implemented method generates a garbled circuit (e.g. a garbled Universal Circuit—UC), for secure function evaluation, having garbled tables with entries corresponding to inputs and outputs of gates of the universal circuit. In case of UC, the circuit is constructed using primarily XOR gates, each with first and second inputs, and an output. For each gate of the circuit, first garbled values w0 are generated in the garbled table and supplied to the first inputs where the values w0 are computed based on an actual value combined with a random number so that the values w0 are random. A fixed global key R based on security parameter N (e.g. N=128 bits) is generated. Non-random second garbled values w1 are generated in the garbled table and supplied to the second inputs where the values w1 are derived based on an actual value exclusive OR'ed with key R. Garbled values in the garbled table corresponding to the outputs of all possible circuit gates are generated (XOR gates do not need associated garbled tables, and this achieves savings in computation). The garbled tables are transmitted from one party to another party with whom the one party desires to exchange information via results produced by the universal circuit. The one party has private inputs P1 and the other party has private inputs P2, where the private inputs are not known to the opposite party.

Another embodiment is directed to generating a garbled table suited to minimize the number of entries needed in the table for each XOR gate used in a universal circuit.

Further embodiments are directed to the construction of Y and X switching blocks that use primarily XOR gates, and are suited for use in universal circuits.

DESCRIPTION OF THE DRAWINGS

Features of exemplary implementations of the invention will become apparent from the description, the claims, and the accompanying drawings in which:

FIG. 4 is a block diagram of an exemplary Y switching block in accordance with the present invention.

FIG. 5 is a block diagram of an exemplary X switching block in accordance with the present invention.

FIG. 6 is a block diagram of an exemplary practical implementation of the Y switching block of FIG. 4.

FIG. 7 is a block diagram of an exemplary practical implementation of the X switching block of FIG. 5.

DETAILED DESCRIPTION

One aspect of the present invention resides in the recognition that known computer simulations of PF-SFE use circuits that require a substantial number of table entries to define each circuit. More specifically, independent random garble table entries have been required for each wire of a circuit in order to provide the desired security of the function. This causes the total number of table entries required to simulate an entire circuit to be very large. Embodiments of the present invention recognize that an exclusive OR construction can be used where the garbling used for one wire of a pair of wires can be computed based on the garbling used for the other wire in the pair by exclusive OR'ing the garble used for the other wire with a random value R. This provides a substantial reduction of the number of entries in a garble table used in defining XOR gates, and also Y and X switching blocks in accordance with an embodiment of the present invention. This results in corresponding performance improvements.

Figure 1:
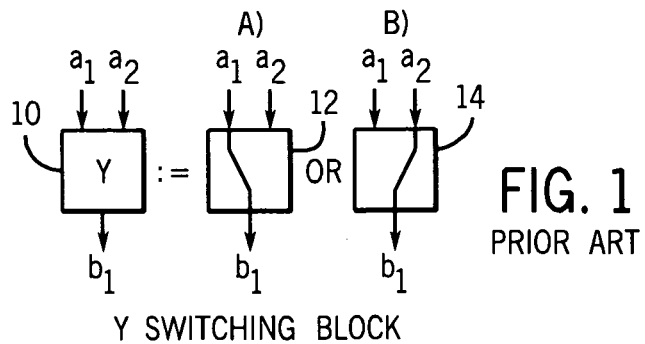
FIG. 1 is a block diagram of a Y switching block.

FIG. 1 shows a known Y switching block 10 that has two inputs and one output. The output either receives one of the inputs as shown in block 12 or receives the other of the inputs as shown in block 14. The Y switching block 10 can be programmed to select the desired input to be transferred to its output.

Figure 2:
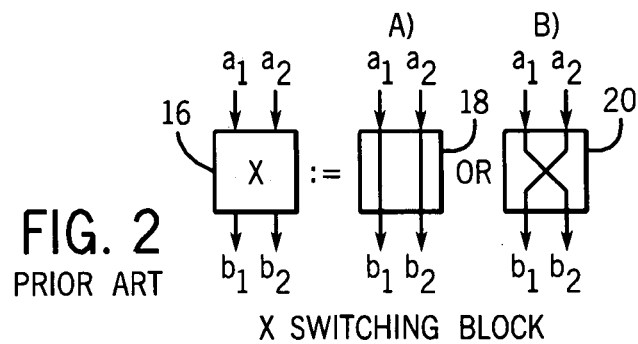
FIG. 2 is a block diagram of an X switching block.

FIG. 2 shows a known X switching block 16 which has two inputs and two outputs. The respective inputs can be coupled straight through to a corresponding output as shown in block 18 or can be cross connected as shown in block 20. The X switching block 16 can be programmed to select whether the inputs will be coupled straight through as in block 18 or cross connected as in block 20.

Figure 3:
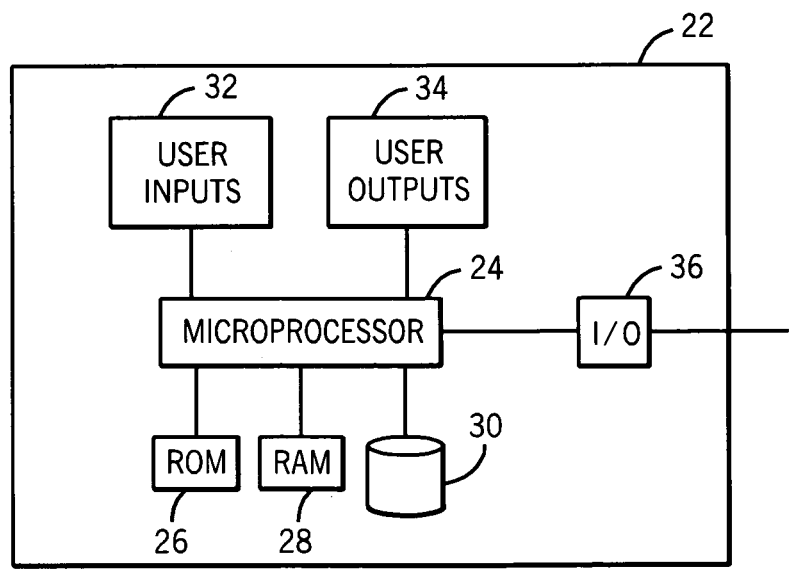
FIG. 3 is a block diagram of a computing system suited for implementing embodiments of the present invention.

In FIG. 3, a computing system 22, suitable for implementing a UC in accordance with the present invention, includes a microprocessor 24 that performs processes and tasks based on stored program instructions. It is supported by read-only memory (ROM) 26, random access memory (RAM) 28 and nonvolatile data storage device 30. As will be understood by those skilled in the art, data and stored program instructions in ROM 26 is typically utilized by microprocessor 24 to initialize and boot the computing apparatus. An application program, e.g. a program that controls the implementation of the UC including programming of individual blocks in the UC and a corresponding garbled table, can be stored in nonvolatile storage element 30. At least active portions of the application program will be typically stored in RAM 28 for ready access and processing by microprocessor 24. A variety of user inputs 32 such as a keyboard, keypad, and mouse can be utilized to input instructions, e.g. control the UC structure and its programming. User output devices 34 such as a display screen and/or printer provide a visual output, e.g. characters, that represent either information input by the user or information associated with an interim or final output of the UC. An input/output (I/O) module 36 provides a communication interface permitting microprocessor 24 to transmit and receive data with external nodes. Software that provides the basic circuit emulations for different types of gates is known in general. Such software can be utilized to construct UCs in accordance with the described embodiments of the present invention.

Consider an SFE implementation of an XOR gate $G_i$ having two input wires $W_a$, $W_b$ and output wire $W_c$. Let N be a security parameter (e.g. N=128). Garble the wire values as follows: Randomly choose $w_a^0$, $w_b^0$, $R \in_R \{0, 1\}^N$. Set $w_c^0 = w_a^0 \oplus w_b^0$, and $\forall i \in \{a, b, c\}: w_i^1 = w_i^0 \oplus R$. It is easy to see that the garbled gate output is simply obtained by XORing garbled gate inputs:

$$w_c^0 = w_a^0 \oplus w_b^0 = (w_a^0 \oplus R) \oplus (w_b^0 \oplus R) = w_a^1 \oplus w_b^1$$

$$w_c^1 = w_c^0 \oplus R = w_a^0 \oplus (w_b^0 \oplus R) = w_a^0 \oplus w_b^1 = (w_a^0 \oplus R) \oplus w_b^0 = w_a^1 \oplus w_b^0.$$

Further, garblings $w_i^1$ do not reveal the wire values they correspond to.

As used herein, $\in_R$ denotes uniform random sampling; $\|$ denotes concatenation of bit strings, $\langle a, b \rangle$ denotes a vector with two components a and b, and its bit string representation is $a\|b$. $W_c = g(W_a, W_b)$ denotes a 2-input gate G that computes function g: $\{0,1\}^2 \to \{0,1\}$ with input wires $W_a$ and $W_b$ and output wire $W_c$.

In the above exemplary exclusive OR construction, the garblings of the two values of each wire in the circuit must differ by the same value:

$$\forall i: w_i^1 = w_i^0 \oplus R$$

where R is a fixed global random number that need be set only once. This should be contrasted to previous garbled circuit constructions in which all garblings $w_i^j$ were required to be chosen independently at random.

Let C be a circuit. XOR gates are constructed as discussed herein. Further, each XOR-gate with n>2 inputs can be replaced with n−1 two-input XOR gates.

All other gates are implemented using standard (known) garbled tables. Namely, each gate with n inputs is assigned a table with $2^n$ randomly permuted entries. Each entry is an encrypted garbling of the output wire, and garblings of the input wires serve as keys to decrypt the "right" output value.

In the exemplary method described below, each garbling w=(k, p) consists of a key $k \in \{0,1\}^N$ and a permutation bit $p \in \{0, 1\}$. The key k is used for decryption of the table entries, and p is used to select the entry for decryption. The two garblings $w_i^0$, $w_i^1$ of each wire $W_i$ are related as required by the XOR construction:

$$R \in_R \{0,1\}^N, \forall i: w_i^1 = \langle k_i^1, p_i^1 \rangle = \langle k_i^0 \oplus R, p_i^0 \oplus 1 \rangle, \text{ where}$$

$$w_i^0 = \langle k_i^0, p_i^0 \rangle$$

where RO is an implementation of a random oracle. In practice RO is efficiently implemented by a suitable cryptographic hash function, such as SHA1 or SHA256.

The below algorithm describes steps of the garbled circuit construction in accord with an embodiment of the present invention.

Algorithm 1.

1. Randomly choose global key offset $R \in_R \{0,1\}^N$
2. For each input wire $W_i$ of C
   (a) Randomly choose its garbled value $w_i^0 = \langle k_i^0, p_i^0 \rangle \in_R \{0,1\}^{N+1}$
   (b) Set the other garbled output value $w_i^1 = \langle k_i^1, p_i^1 \rangle = \langle k_i^0 \oplus R, p_i^0 \oplus 1 \rangle$
3. For each gate $G_i$ of C in topological order
   (a) label $G(i)$ with its index: $\text{label}(G_i) = i$
   (b) If $G_i$ is an XOR-gate $W_c = \text{XOR}(W_a, W_b)$ with garbled input values
   $w_a^0 = \langle k_a^0, p_a^0 \rangle, w_b^0 = \langle k_b^0, p_b^0 \rangle, w_a^1 = \langle k_a^1, p_a^1 \rangle w_b^1 = \langle k_b^1, p_b^1 \rangle$
      i. Set garbled output value $w_c^0 = \langle k_a^0 \oplus k_b^0, p_a \oplus p_b \rangle$
      ii. Set garbled output value $w_c^1 = \langle k_a^0 \oplus k_b^0 \oplus R, p_a \oplus p_b \oplus 1 \rangle$
   (c) If $G_i$ is a 2-input gate $W_c = g_i(W_a, W_b)$ with garbled input values
   $w_a^0 = \langle k_a^0, p_a^0 \rangle, w_b^0 = \langle k_b^0, p_b^0 \rangle, w_a^1 = \langle k_a^1, p_a^1 \rangle w_b^1 = \langle k_b^1, p_b^1 \rangle$
      i. Randomly choose garbled output value $w_c^0 = \langle k_c^0, p_c^0 \rangle \in_R \{0,1\}^{N+1}$
      ii. Set garbled output value $w_c^1 = \langle k_c^1, p_c^1 \rangle = \langle k_c^0 \oplus R, p_c^0 \oplus 1 \rangle$
      iii. Create $G_i$'s garbled table. For each of $2^2$ possible combinations of $G_i$'s input values $v_a, v_b \in \{0,1\}$, set
      $$e_{v_a, v_b} = H(k_a^{v_a} \| k_b^{v_b} \| i) \oplus w_c^{g_i(v_a, v_b)}$$
      Sort entries e in the table by the input pointers, i.e. place entry $e_{v_a, v_b}$ in position $\langle p_a^{v_a}, p_b^{v_b} \rangle$
4. For each circuit-output wire $W_i$ (the output of gate $G_j$) with garblings
   $w_i^0 = \langle k_i^0, p_i^0 \rangle w_i^1 = \langle k_i^1, p_i^1 \rangle$
   (a) Create garbled output table for both possible wire values $v \in \{0,1\}$. Set
   $$e_v = H(k_i^v \| \text{"out"} \| j) \oplus v$$
   Sort entries e in the table by the input pointers, i.e. place entry $e_v$ in position $p_i^v$. (There is no conflict, since $p_i^1 = p_i^0 \oplus 1$.)

The following garbled circuit evaluation algorithm can be implemented by $P_2$, i.e. the party to whom the function itself is unknown. $P_2$ obtains all garbled tables and the garbling of $P_1$'s input values from $P_1$.

Algorithm 2.

1. For each input wire $W_i$ of C
   (a) Receive corresponding garbled value $w_i = \langle k_i, p_i \rangle$
2. For each gate $G_i$ (in the topological order given by Tabels)
   (a) If $G_i$ is an XOR-gate $W_c = \text{XOR}(W_a, W_b)$ with garbled input values
   $w_a = \langle k_a, p_a \rangle, w_b = \langle k_b, p_b \rangle$
      i. Compute garbled output value $w_c = \langle k_c, p_c \rangle = \langle k_a \oplus k_b, p_a \oplus p_b \rangle$
   (b) If $G_i$ is a 2-input gate $W_c = g_i(W_a, W_b)$ with garbled input values $w_a = \langle k_a, p_a \rangle, w_b = \langle k_b, p_b \rangle$
      i. Decrypt garbled output value from garbled table entry e in position $\langle p_a, p_b \rangle w_c = \langle k_c, p_c \rangle = H(k_a \| k_b \| i) \oplus e$
3. For each C's output wire $W_i$ (output of gate $G_j$) with garbling $w_i = \langle k_i, p_i \rangle$
   (a) Decrypt output value $f_i$ form garbled output table entry e in row $p_i$:
   $f_i = H(k_i \| \text{"out"} \| j) \oplus e$ A garbled circuit based SFE protocol, such as described below can be used in conjunction with the above described construction (algorithm 1) and evaluation (algorithm 2) methods to implement a two-party SFE protocol.

Inputs: $P_1$ has private input $x = \langle x_1, \ldots, x_{u_1} \rangle \in \{0,1\}^{u_1}$ and $P_2$ has private input $y = \langle y_1, \ldots, y_{u_2} \rangle \in \{0,1\}^{u_2}$.
Auxiliary input: A boolean acyclic circuit C such that $\forall x \in \{0,1\}^{u_1}, y \in \{0,1\}^{u_2}$, it holds that $C(x,y) = f(x,y)$, where $f : \{0,1\}^{u_1} \times \{0,1\}^{u_2} \to \{0,1\}^v$. We require that C is such that if a circute-output wire leaves some gate G, then gate G has no other wires leading from it into other gates (i.e., no circut-output wire is also a gate-input wire). Likewise, a circuit-input wire that is also a circuit-output wire enters no gates. We also require that C is modified to contain no NOT-gates and all n-input XOR-gates with $n > 2$ replaced by 2-input XOR-gates
The protocol:
1. $P_1$ constructs the garbled circut using Algorithm 1 and sends it (i.e. the garbled tables) to $P_2$.

-continued

2. Let $W_1,...,W_{u_1}$ be the circuit input wires corresponding to x, and let $W_{u_1+1},...,W_{u_1+u_2}$ be the circuit input wires corresponding to y. Then
   (a) $P_1$ sends $P_2$ the garbled values $w_1^{x_1},..., w_{u_1}^{x_{u_1}}$.
   (b) For every $i \in \{1,...,u_2\}$, $P_1$ and $P_2$ execute a 1-out-of-2 oblivious transfer protocol, where $P_1$'s input is $(k_{u_1+i}^0, k_{u_1+i}^1)$, and $P_2$'s input is $y_i$. All $u_2$ OT instances can be run in parallel.
3. $P_2$ now has the garbled tables and the garblings of circuit's input wire. $P_2$ evaluates the garbled circuit, as described in Alg. 2, and outputs $f(x,y)$.

FIG. 4 shows a block diagram of an exemplary Y switching block 40 in accordance with the present invention. One of two inputs (a1, a2) is selected to appear at the output (b1). An XOR function 42 receives both inputs and provides an output to a function 44. An XOR function 46 receives a1 as one input and the output of function 44 as its other input. The output of XOR function 46 consists of the output b1 of this block. The function 44 may consist of a programmable function with two output states: a zero state in which its output is a "0" regardless of its inputs, and an identity state in which its output consists of its input. A more detailed explanation of how this Y switching block, as well as the counterpart X switching block, operates is provided below.

FIG. 5 shows a block diagram of an exemplary X switching block 50 in accordance with the present invention. It has two inputs (a1, a2) and two outputs (b1, b2). It provides outputs as explained with regard to FIG. 2. Each of its inputs are provided as an input to XOR function 52 that provides its output to function 54 which provides the same functionality explained above with regard to function 44 of FIG. 4. XOR function 56 receives a1 as one input with the other input being the output of function 54. XOR function 58 receives a2 as one input with the other input being the output of function 54. The outputs of XOR functions 56 and 58 consist of the block outputs b1 and b2, respectively.

FIG. 6 is a schematic diagram of a practical gate implementation of a Y switching block 60 corresponding to the Y switching block 40 of FIG. 4. Gates 62 and 66 provide XOR functions and gate 64 is an AND gate in which one input receives a control input P, being either 0 or 1.

FIG. 7 is a schematic diagram of a practical gate implementation of an X switching block 70 corresponding to the X switching block 50 of FIG. 5. Gates 72, 76 and 78 provide XOR functions and gate 74 is an AND gate in which one input receives a control input P, being either 0 or 1.

The following describes the operation of the switching blocks shown in FIGS. 4-7 in terms of computer simulated switching blocks forming part of an SFE utilizing garbled table entries.

Let $f: \{0,1\} \mapsto \{0,1\}$ be a function (implemented with two garbled table entries). We implement X- and Y-blocks as followes: $Y(a_1,a_2) = b_1 = f(a_1 \oplus a_2) \oplus a_1$; $X(a_1,a_2) = (b_1,b_2)$, where $b_1 = f(a_1 \oplus a_2) \oplus a_1$, $b_1 = f(a_1 \oplus a_2) \oplus a_2$. It is easy to see that setting $f = f_0$ to the zero function results in Y choosing left input, and X passing the inputs. Further, setting $f = f_{id}$ to the identity function results in Y choosing the right input, and in X crossing its inputs:
$f = f_0$: $b_1 = 0 \oplus a_1 = a_1$; $b_2 = 0 \oplus a_2 = a_2$.
$f = f_{id}$: $b_1 = (a_1 \oplus a_2) \oplus a_1 = a_2$; $b_2 = (a_1 \oplus a_2) \oplus a_2 = a_1$.

Figure 8:
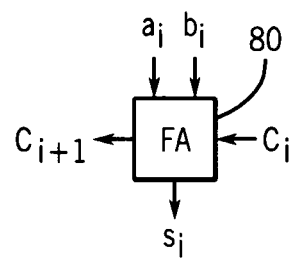
FIG. 8 is a block diagram of an exemplary full adder module used to perform computer implemented mathematical calculations.
Figure 9:
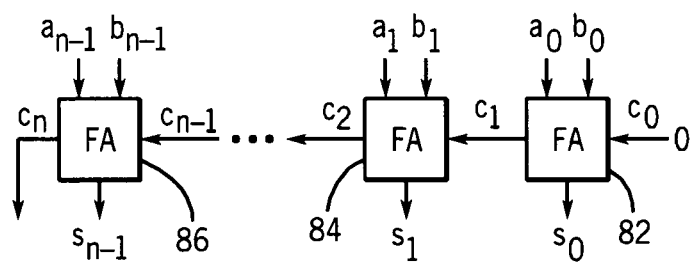
FIG. 9 is a block diagram showing cascaded full adder modules suited to perform n-bit calculations.

Switching from the implementation of an exemplary UC to the implementation of exemplary circuits computing integer addition and/or multiplication, we note that FIG. 8 shows a full adder 80 and FIG. 9 shows an adder for n-bit integers a, b composed from a chain of n full adder (FA) blocks 82, 84, 86.

Adders may be used in GC construction. The last FA block 86 can be replaced by a smaller half-adder block since there is no carry forward needed. A FA block 80 has as inputs a carry-in $C_i$ from the previous FA block and the two input bits $a_i$ and $b_i$. It outputs two bits: carry-out $c_{i+1}$ and sum $s_i$. A straightforward known implementation of a FA uses two 3-input gates with $2 \times 2^3 = 16$ encrypted table entries in a GC. We can compute $s_i$ using "free" XOR gates and use only one 3-input gate with $2^3 = 8$ encrypted table entries to compute $c_{i+1}$. The size of a FA block, and hence that of an n-bit adder, is reduced by 50% in accordance with the embodiments of the present invention.

As circuits for integer multiplication consist of bit-multipliers (2-input AND gates) and adders, the improved implementation of adders can directly be used to correspondingly improve integer-multiplication circuits.

A similar construction is used to test equality of two n-bit integers a and b. Now, the computation of $s_i$ is not needed and the carry bits are used as inequality flags. A simple known implementation uses two 2-input gates or one 3-input gate (each costs 8 encrypted table entries). Free XOR gate reduces the cost to that of one 2-input OR gate (4 encrypted table entries). Thus, the size of equality test block can be reduced by 50%.

The apparatus in one example employs one or more computer readable signal-bearing tangible media. The computer-readable signal-bearing media store software, firmware and/or assembly language for performing one or more portions of one or more embodiments of the invention. The computer-readable signal-bearing medium for the apparatus in one example comprise one or more of a magnetic, electrical, optical, biological, and atomic data storage tangible medium. For example, the computer-readable signal-bearing medium may comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention.

The scope of the invention is defined in the following claims.

We claim:
1. A computer implemented method for executing secure function evaluation defined by a garbled circuit with gates where inputs and outputs of the gates are related by entries in a garbled table, the method comprising the steps of:
   using a plurality of exclusive OR (XOR) gates each having first and second inputs, and an output in a circuit;
   generating a fixed global key R based on security parameter N;
   generating first garbled values w0 assigned to the first inputs where the values w0 are computed based on an actual value combined with a random number so that the values w0 are random;

generating non-random second garbled values w1 in the garbled table assigned to the second inputs where the values w1 are derived based on an actual value exclusive OR'ed with key R;

generating, for other gates in the circuit that are not XOR gates, garbled values and corresponding garbled table entries, where entries in the garbled table are not required for inputs and outputs of the XOR;

transmitting the garbled tables and garblings of active circuit input wires from one party to another party with whom the one party desires to exchange information via results produced by a universal circuit where the one party has private inputs P1 and the another party has private inputs P2, where the private inputs are not known to the opposite party;

calculating at least one resultant output from the circuit based on the inputs P1 and P2, and the secure function evaluation as defined by the gates of the circuit.

2. The method of claim 1 where the circuit contains at least one Y switching block with two inputs A1, A2 and one output B1, the Y switching block implemented comprising the steps of:

receiving input A1 as an input by first and second 2-input XOR gates;

receiving input A2 as an input by the first XOR gate;

coupling the output of the first XOR gate to an input of an AND gate;

coupling a control input to the other input of the AND gate;

coupling the output of the AND gate to another input of the second XOR gate;

the output of the second XOR gate being the output B1.

3. The method of claim 2 further comprising the step of the control input being a logic zero results in the output B1 being the input A1, the control input being a logic one results in the output B1 being the input A2.

4. The method of claim 1 wherein the same fixed value of key R is used for all computations involving key R.

5. The method of claim 1 wherein values for w0 and w1 are related to each other where w1 is the result of exclusive OR'ing w0 and R.

6. The method of claim 1 where the circuit contains at least one X switching block with two inputs A1, A2 and two outputs B1, B2, the X switching block implemented comprising the steps of:

receiving input A1 as an input by first and second 2-input XOR gates;

receiving input A2 as an input by first and third two-input XOR gates;

coupling the output of the first XOR gate to an input of an AND gate;

coupling a control input to the other input of the AND gate;

coupling the output of the AND gate to the other inputs of the second and third XOR gates;

the output of the second and third XOR gates being the outputs B1 and B2, respectively.

7. The method of claim 6 further comprising the step of the control input being a logic zero resulting in the outputs B1 and B2 being inputs A1 and A2, respectively, the control input being a logic one resulting in the outputs B1 and B2 being inputs A2 and A1, respectively.

8. The method of claim 1 further comprising the step of executing the circuit by the another party based on the garbled table received from the one party, inputting the private inputs P2 known by the other party, and displaying to the other party a resultant value on the at least one resultant output.

9. The method of claim 1 further comprising the steps of:

receiving for each of the first and second inputs of the XOR gates garbled values defined by a key k and a permutation bit p;

computing a garbled output value for each XOR gate as two vectors, the first vector being a value resulting from exclusive OR'ing the key k associated with the first input with key k associated with the second input of the subject XOR gate, second vector being the value resulting from exclusive OK'ing the permutation bit p associated with the first input with the permutation bit p associated with second input of the subject XOR gate, where said two vectors define the garbled output value of each XOR gate.

10. A computer implemented method for generating garbled gates with inputs and outputs that define at least a portion of a circuit that implements a secure function evaluation, the method comprising the steps of:

generating a fixed global key R based on security parameter N, the same value of key R being used for all computations involving key R;

emulating a first exclusive OR (XOR) gate having only two inputs (first and second inputs) and an output, each of the first and second inputs and the output having associated garbled values defined by two vectors, w0 and w1;

setting the garbled value of the output equal to a value obtained by exclusive OR'ing the garbled values of the inputs;

calculating vector w1 for each of the first input, second input and output to be equal to the corresponding vector w0 of the first input, second input and output, respectively, exclusive OR'ed with R so that the garbled value associated with vector w1 for each of the first input, second input, and the output differ from the garbled value associated with vector w0 for each of the first input, second input, and the output, respectively, by the same amount;

calculating the output vector w1 by using the XOR gate to exclusive OR the first input vector w1 with the second input vector w0, whereby implementation of the XOR gate is performed without a requirement for entries in a garble table associated with inputs and output of the XOR gate.

11. An electronic circuit that executes secure function evaluation defined by a garbled circuit with gates where inputs and outputs of the gates are related by entries in a garbled table, the electronic circuit having 2-inputs A1, A2, and one output B1 comprising:

a first 2-input XOR gate with one input receiving input A1 and the other input receiving input A2;

a 2-input AND gate with one input receiving the output from the first XOR gate and the other input receiving a control input;

a second 2-input XOR gate with one input receiving the input A1 and the other input receiving the output from the AND gate;

the output of the second XOR gate defining output B1.

12. The electronic circuit of claim 11 wherein the control input being a logic zero results in the output B1 being the input A1, the control input being a logic one results in the output B1 being the input A2, the electronic circuit being a Y switching block.

13. The electronic circuit of claim 11 comprising:

another output B2 of the electronic circuit;

a third 2-input XOR gate having one input connected to the output of the AND gate and its other input connected to the input A2;

the output of the third XOR gate being output B2.

14. The electronic circuit of claim 13 wherein the control input being a logic zero results in the outputs B1 and B2 being inputs A1 and A2, respectively, the control input being a logic one resulting in the outputs B1 and B2 being inputs A2 and A1, respectively, and the electronic circuit being an X switching block.

* * * * *